Patented Dec. 4, 1951

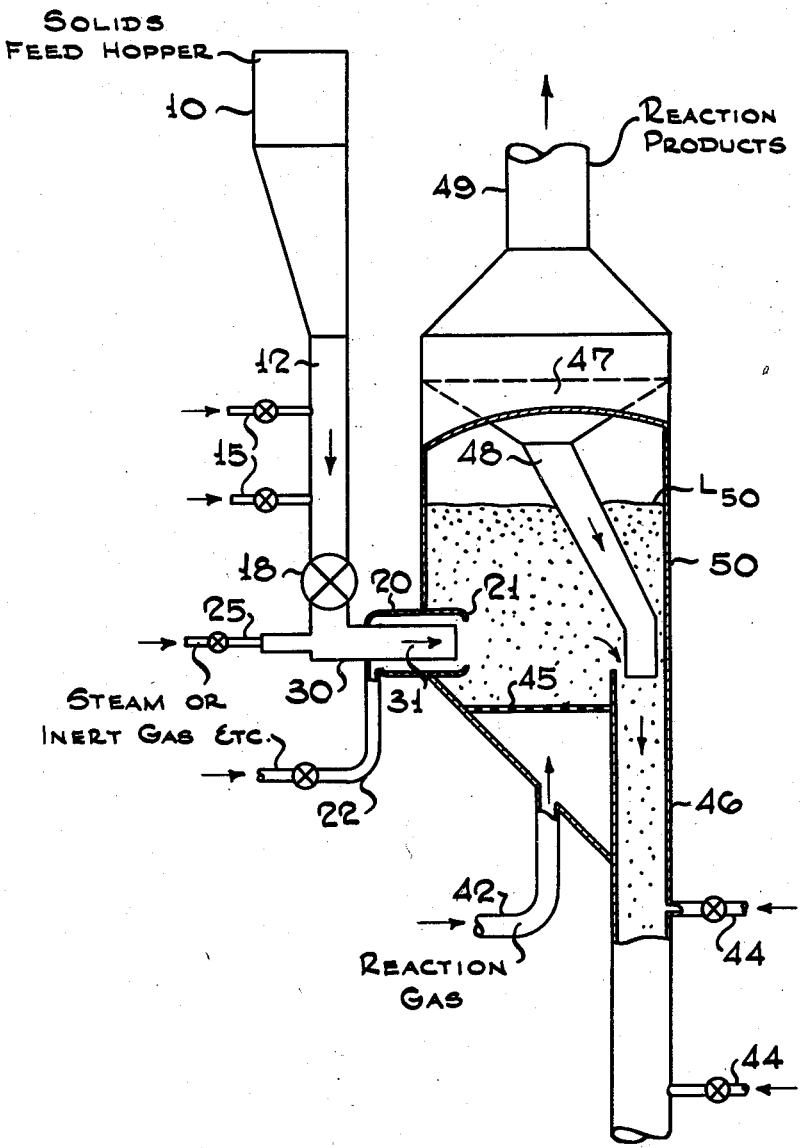

2,577,632

UNITED STATES PATENT OFFICE 2,577,632

PROCESS FOR SUPPLYING PLASTICIZABLE CARBONACEOUS SOLIDS INTO A GASIFICATION ZONE

Bruno E. Roetheli, Cranford, N. J., assignor to Standard Oil Development Company, a corporation of Delaware Application August 27, 1946, Serial No. 693,298

8 Claims. (Cl. 48—203)

The present invention relates to improved means for handling solids and more particularly to means for facilitating the charging of high temperature solids treating zones with solids which tend to go through plastic stages when heated.

It is well known in the art that numerous solids such as bituminous coal, lignite, oil shale, asphalt, cellulosic material, including lignin, and the like pass through a plastic state when heated slowly to temperatures within the range of about 500°–1000° F., depending on the character of the solids. When this plastic state is reached the solid particles tend to agglomerate or "coke" or to stick to each other and to equipment walls. This phenomenon has caused considerable difficulties when charging such solids to high temperature solids treating zones such as carbonization chambers, gasification chambers, furnaces, etc. which are operated at temperatures higher than the plasticity temperature of the solids charge. Heat of radiation or convection from the hot reacting mass of solids in the treating zone heats up the walls of solids feeding devices to plasticization temperature, thus causing the charge to "coke" in the feed line and to plug the feeding device.

Particularly serious difficulties arise under certain conditions when the fluidized solids technique is employed for heat treating solids of this type. This technique involves the treatment of the solids in the form of a dense highly turbulent mass of finely divided solids fluidized by a gas flowing upwardly through the mass which resembles a boiling liquid with respect to appearance, heat transfer characteristics and hydrostatic and hydrodynamic properties. "Coking" of the finely divided solids fed not only interferes with the charging of the finely divided solids feed but in addition detrimentally affects the proper fluidization of the solids particles in the fluid treating zone.

The present invention overcomes the aforementioned difficulties and affords various additional advantages. These advantages, the nature of the invention and the manner in which it is carried out will be fully understood from the following description thereof read with reference to the accompanying drawing.

It is, therefore, the principal object of my invention to provide improved means for feeding solids to a high temperature treating zone.

Another object of my invention is to provide an improved method and apparatus for feeding to a high temperature treating zone such solids as tend to pass through a plastic state at elevated temperatures.

A further object of my invention is to provide an improved method and apparatus for preventing solids passing through a plastic state at elevated temperatures from "coking" and plugging the device feeding such solids to a high temperature treating zone.

A still further object of my invention is to provide improved means for preventing finely divided solids passing through a plastic state at elevated temperatures from agglomerating while passing through a high temperature treating system employing the fluid solids technique.

Other and more specific objects and advantages of my invention will appear hereinafter.

I have found that I may avoid the "coking" or agglomeration of solids which pass through a plastic state at elevated temperatures and which are subjected to temperatures above plasticizing temperature in a high temperature treating zone by maintaining the solids charge in the solids feed device at a temperature substantially below plasticizing temperature and preventing the heat of the treating zone from substantially heating the solids by radiation or convection prior to the introduction of the solids to the solids mass treated in the treating zone. When operating in this manner, the cool solids charge is added to the hot mass of solids undergoing treatment before it reaches the plastic state. Upon contact with the hot solids in the treating zone, the rate of heat transfer to the charged solid particles is sufficiently high to cause rapid heating through and beyond the plasticizing temperature region to the actual treating temperature, thus preventing the charge from "coking." This effect is particularly marked when the solids undergoing treatment exist in the form of a dense highly turbulent fluidized mass having the heat transfer characteristics of a liquid.

In accordance with the preferred embodiment of the invention the solids charge is maintained below plasticizing temperatures by passing it through the feeding device with a gas, which will not detrimentally affect the high temperature treatment in the treating zone, at a temperature below plasticizing temperature and in contact with feeding device walls kept below plasticizing temperature. Best results are obtained when at least a portion of the cooling gas is permitted to enter the treating zone in the direction of the solids feed. In this manner the heating of the feed solids in the feeding device by radiation or convection is minimized.

The choice of a suitable cooling gas depends on the kind of treatment conducted in the treating zone. For example, if the treating zone serves the carbonization of solid carbonizable fuels such as carbonization coal, shale, tar sands, gilsonite, cellulosic material, etc. suitable gases include steam, flue gas, light hydrocarbons, nitrogen, or similar inert gases which may be readily removed from gaseous carbonization products. The same gases, as well as pure oxygen or oxygen-containing gas, may be applied in the manufacture of water gas from lignite or bituminous coal without detrimentally affecting the course of the reaction. If the treating zone serves the conversion of carbonaceous solids into producer gas, air or "enriched" air may take the place of the gases just mentioned.

The amount, flow speed and temperature of the cooling gas required in each individual case depend on the difference between the plasticizing temperature of the solid and the temperature of the treating zone, the specific design of the feeding device, the rate of solids charge, the type and particle size of the solids and, to a certain extent, on the specific heat of the gas. In general, it is sufficient to control the amount, flow speed and temperature of the cooling gas in such a manner that the solids are kept at a temperature which is about 20 to 50° F. below the plasticizing temperature at the outlet of the feeding device.

Having set forth the general nature and objects, the invention will be best understood from the more detailed description hereinafter, in which reference will be made to the accompanying drawing which illustrates semidiagrammatically a system suitable for carrying out a preferred modifications of the present invention.

Referring now in detail to the drawing, I have shown therein a system comprising essentially a solids feed hopper 10, a solids feeding device 30 and a solids treating zone 50 adapted for fluid solids operation. The functions and cooperation of these elements will be presently explained using, as an example, the production of producer gas from a bituminous coal having a plasticizing temperature of about 600° to 750° F. However, it should be understood that the same or a similar system may be used in a substantially analogous manner for the gasification, carbonization, distillation, coking or similar treatment of other carbonaceous solids.

Subdivided bituminous coal having a plasticizing temperature of about 600° to 750° F. is supplied by any suitable means (not shown) to feed hopper 10. The particle size of the coal may vary from less than 100 mesh to ¼ or ½ inch. The lower, preferably conical, section of feed hopper 10 leads into a vertical standpipe 12 provided with fluidizing taps 15 through which a fluidizing gas such as steam, flue gas or the like may be introduced to facilitate the flow of the finely divided coal through standpipe 12 in a manner known in the art of handling fluidized solids. Where the particles are large and disintegrate upon contact with hot fluidized solids, lock hoppers may be employed at the top of standpipe 12. The flow of fluidized coal through standpipe 12 is controlled by a slide valve 18 which admits the coal to feeding device 30, at a rate of about 0.012 to 0.02 lb. per cu. ft. of producer gas to be produced.

The fluidized coal flows under the pseudo-hydrostatic pressure of the fluidized solids column in standpipe 12 from feeding device 30 into treating zone 50 wherein it forms a dense turbulent mass of coal fluidized by a gas supplied through line 42 and lower distributing grid 45 to form a well-defined upper level $L_{50}$. The gasification reaction in treating zone 50 may be carried out substantially as described in the copending Hawkins applications, Serial No. 491,389, filed June 13, 1943, now abandoned, and Serial No. 597,814, filed June 6, 1945. That is, a mixture of steam and an oxidizing gas, preferably oxygen, or a gas rich in oxygen, is supplied through line 42 and the fluidized coal bed in treating zone 50 is maintained at the desired gasification temperature of about 1600°–2000° F. by partial combustion of carbonaceous materials within zone 50 by means of the oxygen supplied through line 42. At the temperatures indicated carbon is burned to form a substantial amount of carbon monoxide and some of the steam is converted to hydrogen. The gases are passed to a conventional gas solids separator 47 and discharge pipe 49 to any desired use or further treatment. Solids fines separated in separator 47 may be returned through line 48 either to the fluidized bed in zone 50 or to the solids withdrawal pipe 46 through which solid gasification residue is removed from the reaction zone. The solids flow through pipe 46 may be facilitated by the introduction of a fluidizing gas through taps 44.

Returning now to solids feed device 30 the pipe 31 carrying the solids into treating zone 50 is provided with a jacket 20 which penetrates over a certain distance into treating zone 50. Jacket 20 should be at least as long as or preferably longer than pipe 31. The overlapping end of jacket 20 is preferably tapered to provide a cone type injection of the gases from jacket 20. Jacket 20 is closed outside treating zone 50 and open at its end 21 within treating zone 50. A cooling gas such as steam, flue gas, etc. or mixtures thereof capable of absorbing radiant energy and having a temperature of about 150° to 450° F. is admitted through pipe 22 to jacket 20 and flows therein in the direction of the coal feed to enter treating zone 50 through open end 21. Simultaneously a similar cooling gas having a temperature of about 100° to 250° F. is passed through line 25 into pipe 31 at a superficial velocity of about 5 to 30 ft. per second to mix with the coal and to pass in mixture with the coal through pipe 31 into treating zone 50. The combined effect of the cooling gases flowing within and around feed pipe 31 in the direction of the coal feed permits the maintenance of the coal temperature at a point adjacent to open end 21 at a level of about 400° to 575° F., that is, substantially below the plasticizing temperature, in spite of the extremely high temperature with zone 50, the open connection between pipe 31 and zone 50, and a heat conducting support of pipe 31 in the wall of treating zone 50. In this manner agglomeration of solid feed and plugging of the feed line is avoided.

After the finely divided coal reaches the turbulent heated mass in zone 50 the rate of transfer of heat to the fresh charge is so high that the plasticizing temperature is rapidly passed without permitting "coking" of the charge. Since the material in conversion zone 50 is extremely "dry," that is, free of plasticizing constitutents, it is capable of absorbing up to 10 or 20% of "liquid" material, that is, plasticizing constituents, without impairment of its fluidizing properties. The process may, therefore, be operated in a fully continuous manner without danger of plugging or fluidization troubles.

The embodiment of my invention illustrated by the drawing permits of various modifications. Instead of supplying the finely divided solids from a feed hopper through a standpipe to feeding device 30, I may use mechanical conveying means such as a screw conveyor, lock hoppers, star feeders, or the like to pass the solids feed from any conventional solids storage through feed pipe 31 into treating zone 50 at a pressure at or above that existing in the hopper without departing from the spirit of the invention.

The heat required for the gasification reaction may be supplied wholly or in part, as sensible heat of hot solid residues of a combustion of carbonaceous gasification residue, carried out in a separate heater as described in my copending applications, Serial No. 487,187, filed May 15, 1943, and Serial No. 609,662, filed August 8, 1945. It should also be understood that the application of my invention is not limited to the handling of solids by the fluid solids technique but extends to fixed or moving bed operation wherein coarse solids are continuously or intermittently fed to a high temperature reaction zone.

My invention will be further illustrated by the following specific example.

*Example*

When making producer gas in a fluidized solids gas producer from bituminous coal, the coal, finely ground to a particle size of 50-200 mesh and fluidized to form a suspension having a density of about 20#/cf., is admitted to standpipe 12 at the rate of 2 ft./second. The fluidized coal passes through valve 18 into the feeder at which point it meets with a stream of air amounting to about 0.2 cu. ft. per lb. of coal, flowing at a superficial velocity of about 10 ft./second and entering feeder 30 at about 150° F. The mixture of coal and air flows through pipe 31 which projects for a distance of ¼ to ½ the diameter of gasification vessel 50 into the turbulent fluidized gasification mass in vessel 50. The reacting mass is at a temperature of 2,000° F. and in a highly fluidized state. At the same time steam is passed through the jacket 20 at a rate of about 1.5 lbs. per lb. of coal charged. Under these conditions the coal-gas mixture is discharged into the reaction zone at a temperature of about 575° F.

The foregoing description and exemplary operations have served to illustrate specific applications and results of my invention. However, other modifications obvious to those skilled in the art are within the scope of my invention. Only such limitations should be imposed on the invention as are indicated in the appended claims.

I claim:

1. In the process of supplying finely divided solids which pass through a plastic state at elevated temperatures, to a treating zone operated at a temperature higher than said plasticizing temperature, wherein said solids are maintained in the form of a dense turbulent mass of finely divided solids fluidized by an upwardly flowing gas to resemble a boiling liquid having a well defined upper level, the improvement which comprises passing finely divided solids of a fluidizable particle size under the pseudo-hydrostatic pressure of a vertical aerated column of said solids the upper level of which is substantially above said first named level, through a confined path opening into said treating zone below said first named level at a point above, but close to, the bottom of said mass, and introducing a gaseous medium which does not detrimentally affect the desired treatment in said treating zone and which has a temperature lower than said plasticizing temperature, in heat exchange with and in the direction of flow of said finely divided solids, into said treating zone, at a rate not substantially exceeding that required to maintain the temperature of said finely divided solids below plasticizing temperature prior to the entry into said treating zone.

2. The process of claim 1 wherein said solid is a carbonaceous material and said treating zone is a gas generation zone.

3. The process as claimed in claim 1 wherein at least a portion of said gaseous medium flows outside said path.

4. The process as claimed in claim 1 wherein at least a portion of said gaseous medium flows inside said path.

5. The process of claim 1 wherein said gaseous medium is selected from the group consisting of steam flue gas, oxygen and air.

6. The process of claim 1 wherein said solids materials are selected from the group consisting of coking coal, lignite, oil shale, tar sands, asphalt and cellulosic materials.

7. The process of claim 1 wherein a portion of said gaseous medium flows outside said path and said portion comprises flue gas having a high absorption capacity for radiant energy.

8. The process of claim 1 wherein said solid is a carbonaceous material and said treating zone is a carbonization zone.

BRUNO E. ROETHELI.

REFERENCES CITED

The following references are of record in the file of this patent:

UNITED STATES PATENTS

| Number | Name | Date |
|---|---|---|
| 1,204,789 | Kuhn | Nov. 14, 1916 |
| 1,799,885 | Chavanne | Apr. 7, 1931 |
| 2,432,135 | Barr | Dec. 9, 1947 |

FOREIGN PATENTS

| Number | Country | Date |
|---|---|---|
| 1,091 of 1903 | Great Britain | Nov. 12, 1903 |
| 296,751 | Great Britain | Sept. 3, 1928 |